US008533515B2

(12) United States Patent
Lakshminarayanan et al.

(10) Patent No.: US 8,533,515 B2
(45) Date of Patent: Sep. 10, 2013

(54) METHOD AND SYSTEM FOR SYNCHRONIZING MULTIPLE SECURE CLOCKS USING AN AVERAGE ADJUSTED TIME OF THE SECURE CLOCKS IF THE AVERAGE ADJUSTED TIME IS WITHIN THE LIMIT INTERSECTION AND USING A SUBSTITUTE AVERAGE ADJUSTED TIME IF THE AVERAGED ADJUSTED TIME IS OUTSIDE THE LIMIT INTERSECTION

(75) Inventors: Gopi Lakshminarayanan, Fremont, CA (US); Dossym Nurmukhanov, South San Francisco, CA (US); Sergio Martinez, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 267 days.

(21) Appl. No.: 13/201,825

(22) PCT Filed: Feb. 16, 2010

(86) PCT No.: PCT/US2010/024330

§ 371 (c)(1),
(2), (4) Date: Aug. 16, 2011

(87) PCT Pub. No.: WO2010/096391

PCT Pub. Date: Aug. 26, 2010

(65) Prior Publication Data

US 2011/0302443 A1 Dec. 8, 2011

Related U.S. Application Data

(60) Provisional application No. 61/153,360, filed on Feb. 18, 2009.

(51) Int. Cl.
*G06F 1/12* (2006.01)

(52) U.S. Cl.
USPC .......... 713/400

(58) Field of Classification Search
USPC .......... 713/400
See application file for complete search history.

(56) References Cited

U.S. PATENT DOCUMENTS

| | | | | |
|---|---|---|---|---|
| 4,144,414 | A | 3/1979 | Nicholas | |
| 4,746,920 | A | 5/1988 | Nellen | |
| 4,882,739 | A * | 11/1989 | Potash et al. | 375/358 |
| 5,629,980 | A | 5/1997 | Stefik | |
| 5,907,685 | A | 5/1999 | Douceur | |
| 7,266,714 | B2 | 9/2007 | Davies | |
| 7,349,512 | B2 | 3/2008 | Rausch | |
| 7,409,022 | B2 | 8/2008 | Dai | |
| 2005/0223297 | A1 | 10/2005 | Nakamura | |
| 2005/0276167 | A1 * | 12/2005 | Davies et al. | 368/187 |
| 2009/0304135 | A1 * | 12/2009 | Suzuki et al. | 375/354 |

FOREIGN PATENT DOCUMENTS

| | | |
|---|---|---|
| WO | 2007064086 | 6/2007 |
| WO | 2008140442 | 11/2008 |

* cited by examiner

*Primary Examiner* — Thomas Lee
*Assistant Examiner* — Robert Cassity

(57) ABSTRACT

A method for synchronizing secure clocks in a system without using any external clock, a system configured to perform the method, and a computer medium storing system code. Each secure clock is adjustable subject to a set of predetermined adjustment constraints. The intersection of the adjustment constraints of all the clocks is a limit intersection. The clocks may be synchronized to an average adjusted time of the secure clocks (if the average adjusted time is within the limit intersection) or to a substitute average adjusted time within the limit intersection if the average adjusted time is outside the limit intersection. Synchronization can occur in response to a request to adjust at least one of the clocks by a proposed clock adjustment value or to synchronize at least one of them without otherwise adjusting them.

40 Claims, 2 Drawing Sheets

METHOD AND SYSTEM FOR SYNCHRONIZING MULTIPLE SECURE CLOCKS USING AN AVERAGE ADJUSTED TIME OF THE SECURE CLOCKS IF THE AVERAGE ADJUSTED TIME IS WITHIN THE LIMIT INTERSECTION AND USING A SUBSTITUTE AVERAGE ADJUSTED TIME IF THE AVERAGED ADJUSTED TIME IS OUTSIDE THE LIMIT INTERSECTION

1. CROSS-REFERENCE TO RELATED APPLICATIONS

This application claims priority to U.S. Provisional Patent Application No. 61/153,360 filed 18 Feb. 2009, hereby incorporated by reference in its entirety.

2. FIELD OF THE INVENTION

The present invention relates to methods and systems for synchronizing clocks, subject to constraints on the amount by which each clock may be adjusted relative to an initial or reference time value.

3. BACKGROUND OF THE INVENTION

Throughout this disclosure including in the claims, the expression "system" is used in a broad sense to denote a device, system, or subsystem. For example, a device that implements a clock may be referred to herein as a system, and a system including such device may also be referred to herein as a system.

Throughout this disclosure including in the claims, the expression "secure clock" denotes a clock (or a system implementing a clock), where the clock is configured to be set to a reference time (e.g., an initial time set at time of manufacture) and to be adjustable relative to the reference time subject to predetermined constraints. Typically, a secure clock is initially set by a user or trusted time authority and once initially set, it is "locked" such that restrictions are imposed on further adjustments. For example, a secure clock may be configured to respond to a request to adjust its time by determining if the requested adjustment time (summed with all previous adjustment times since the initial setting, if any) is within a predetermined maximum adjustment limit (a maximum cumulative adjustment time relative to the reference time), and performing the requested adjustment only upon determining that the requested adjustment time (summed with each prior adjustment time) is within the maximum adjustment limit.

In some cases, the adjustment limit is (or is a function of) a predicted range of clock drift or some multiple of a predicted range of clock drift. The predicted range of clock drift may be determined in any suitable way. For example, the predicted range of drift may be the worst-case drift of the clock as determined from tolerances of the components used in the clock, preferably taking into account the operating and storage temperature ranges with and without power applied to non-clock portion of the device or other system with which the clock is associated (assuming that power is continuously applied to the clock, whether or not the associated system device is powered and operating). A typical tolerance may be in the range of 10-50 ppm.

Many devices (e.g., digital content reproduction devices) and other systems implement time-based access rules (e.g., Digital Rights Management or "DRM" rules) that require a clock to indicate times with respect to which rights are validated. For example, playback of audio or video content may be permitted only during a predetermined time interval (e.g., only during an X-hour period commencing at a reference time, which may be a specific UTC time or other universal time). The clock, which may be implemented internally or may be an external clock that is accessed from an external source, typically must be accurate (so that permissions are granted only when they should be) and typically must be a secure clock (so that a user cannot easily defeat the DRM by setting the current time to a false time within a permitted time window).

A variety of systems and methods are currently used for maintaining both accuracy and security of a secure clock. Some systems lock an internal clock to an external secure clock so that the internal clock does not drift. For example, a clock in a processing system may lock to a Network Time Protocol (NTP) server via the Internet using secure network transactions, or a clock in a Global Positioning Satellite (GPS) receiver may lock to a clock provided by the GPS system.

However, in some circumstances either no connection to a secure external clock is feasible or a continuous connection to a secure external clock is unavailable. If no suitable secure external clock is available, a free-running internal clock can be used as a secure clock. However, a free-running clock suffers from drift and will typically need to be adjusted from time to time in order to maintain accuracy while preserving security (e.g., so as to prevent users from easily defeating DRM restrictions by setting the current time to a false time within a permitted time window).

U.S. Pat. No. 7,266,714, issued Sep. 4, 2007 (assigned to the assignee of the present invention), discloses a method for adjusting the time of a secure clock only upon determining that the degree of adjustment is within a limit based on the clock's initial time. U.S. Pat. No. 7,266,714 teaches adjusting a free-running secure clock in response to an adjustment request only if the requested adjustment (cumulated with previous adjustments to the clock) would not exceed a predetermined limit (a predicted clock drift). The clock may be initially set by a user or trusted time authority or the like. The method includes the steps of receiving a request to adjust the clock, determining if the requested adjustment (summed with prior adjustments, if any) is within the limit, and permitting the request only if the degree of requested adjustment summed with any prior adjustments is within the limit, or performing a partial adjustment in response to the request (to adjust the clock as nearly as possible to the requested adjusted time without exceeding the limit). U.S. Pat. No. 7,266,714 also teaches synchronizing each of at least two secure clocks (in a set of secure clocks) sequentially to one of the clocks in the set (e.g., to a "newest" clock in the set which has been most recently updated using an external clock).

In many applications, multiple free-running secure clocks are needed. For example, in a multiplex motion picture theater each of two or more content playback devices or other systems may implement an internal secure clock. All the secure clocks may need to be adjusted for accuracy and synchronized subject to at least one predetermined adjustment constraint. All the secure clocks may be subject to a common adjustment constraint (or set of adjustment constraints) or each may be subject to a different adjustment constraint or set of constraints.

An exemplary system that uses multiple secure clocks is a D-Cinema multiplex installation satisfying the well-known Digital Cinema System Specification, Version 1.2, promulgated by Digital Cinema Initiatives LLC. Multiple IMBs (Image Media Blocks) are present in such an installation, and each IMB implements its own secure clock known as a Secure Real Time Clock ("SRTC"). Under normal circumstances, the SRTCs are adjusted and synchronized by setting them periodically using an external secure clock (an NTP server) or a clock derived from an external secure clock. Each SRTC has its own predetermined adjustment limit (a maximum allowable adjustment relative to an initial time that is set at manufacture) determined from a predicted range of clock drift. However, the secure SRTCs in IMBs ("IMB clocks") are typically of relatively low quality and subject to wide swings in temperature. This can result in large amounts of drift for each IMB clock and thus large (e.g., up to 5 minutes per year) time differences between the IMB clocks due to drift after the IMB clocks have been set to a common initial time (e.g., by being synchronized to an external clock). There is a need for adjusting (to satisfy applicable accuracy requirements subject to security constraints) and synchronizing a set of IMB clocks in a common installation without using a clock external to the IMB clocks. This is because royalties, licenses, and/or other events and quantities may be timed off one or more IMB clocks and it is often not feasible to synchronize each relevant IMB clock using an external clock sufficiently frequently to satisfy applicable accuracy requirements.

More generally, there is a need for a method for maintaining synchronization and accuracy of multiple secure clocks that are free running, but configured to be adjusted by a user to correct for drift, without compromising the security of each such clock and without using an external clock. The expedient of synchronizing each secure clock in a set of free running, secure clocks from time to time (e.g., periodically), each time by choosing one of the clocks in the set and synchronizing each of the other clocks sequentially to the chosen clock, typically will not provide sufficient accuracy because the chosen clock may be subject to significant drift.

BRIEF DESCRIPTION OF THE INVENTION

In a first class of embodiments, the invention is a method for synchronizing at least two secure clocks in a system without using any clock external to the system (i.e., any "external clock"). The synchronizing can occur in response to a request to adjust the secure clocks by a proposed clock adjustment value (e.g., to reduce their time values by "X" seconds) or to synchronize them without otherwise adjusting them. Each of the secure clocks is adjustable subject to a set of one or more predetermined adjustment constraints (each clock may be subject to a different set of adjustment constraints, or all the clocks may be subject to a common set of adjustment constraints). Typically, each set of adjustment constraints is a maximum adjusted time and a minimum adjusted time, and each secure clock can be adjusted to any time in the range ("allowed adjustment range") between the maximum adjusted time and minimum adjusted time. Typically, the maximum adjusted time for each clock is an initial time (e.g., an initial time determined at manufacture) plus an allowable clock drift, and the minimum adjusted time for the clock is the initial time minus the allowable clock drift. Typically, the allowable clock drift for a secure clock is (or is a multiple or other function of) a predicted range of drift for the clock. The intersection of the adjustment constraints of all the secure clocks (referred to herein as the "limit intersection") is predetermined, known to the system, and nonempty (includes at least one time value), and is the set or range of all clock times to which all the secure clocks can be synchronized without violating an adjustment constraint of any of the secure clocks. When each of the secure clocks has an allowed adjustment range, the limit intersection is the intersection of all the allowed adjustment ranges.

In the first class of embodiments, the system determines an average adjusted time of the secure clocks and determines whether the average adjusted time is within the limit intersection, and synchronizes one (or all or some) of the secure clocks to the average adjusted time (if the average adjusted time is within the limit intersection) or to a substitute average adjusted time within the limit intersection if the average adjusted time is outside the limit intersection (e.g., if the average adjusted time is outside the allowed adjustment range of at least one of the secure clocks). This can occur in response to a request to adjust one of the secure clocks by a proposed clock adjustment value (e.g., to reduce the time value thereof by "X" seconds) or to synchronize one of them without otherwise adjusting it. In the latter case, the system synchronizes the clock to an average time (a special case of the more general expression "average adjusted time") if the average time is within the limit intersection, or to a substitute average time (a special case of the more general expression "substitute average adjusted time") within the limit intersection if the average time is outside the limit intersection.

The substitute average adjusted time is a time within the limit intersection that approximates (e.g., most nearly matches) the average adjusted time. In preferred embodiments, the substitute average adjusted time is a boundary of the limit intersection nearest to the average adjusted time (i.e., the upper or lower boundary of the limit intersection, whichever is nearest to the average adjusted time). In a typical implementation in which each secure clock's set of adjustment constraints is a maximum adjusted time and a minimum adjusted time (and the secure clock can be adjusted to any time in the allowed adjustment range between the maximum adjusted time and minimum adjusted time), the secure clocks are synchronized as follows:

a smallest of the maximum adjusted times of all the secure clocks is determined (e.g., calculated by clock monitor software), a largest of the minimum adjusted times of the secure clocks is determined (e.g., by the clock monitor software), and an average adjusted time of the secure clocks is determined (e.g., by the clock monitor software). The average adjusted time is the average of the current times of the secure clocks, where the current time of each of the clocks is as adjusted by any previous adjustment(s) to the time of said one of the clocks, said average adjusted by any proposed (non-zero) clock adjustment value. The smallest of the maximum adjusted times is the upper bound of the adjustment limit intersection and the largest of the minimum adjusted times is the lower bound of the adjustment limit intersection. If the secure clocks are operating properly, were initially set to GMT (or other universal time), and their drift specifications are being met, then the actual time (GMT or other universal time) is contained within the adjustment limit intersection; and at least one the secure clocks is (e.g., some or all of the secure clocks are) synchronized to the average adjusted time if the average adjusted time is within the adjustment limit intersection, and the secure clock is (or the clocks are) synchronized to a nearest bound of the adjustment limit intersection if the average adjusted time is not within the adjustment limit intersection. The nearest bound of the adjustment limit intersection is the smallest of the maximum adjusted times if the average adjusted time is greater than said smallest of the maximum adjusted times, and is the largest of the minimum adjusted times if the average adjusted time is less than said largest of the minimum adjusted times.

In some embodiments, each secure clock is a Secure Real Time Clock (SRTC), the system is a D-Cinema multiplex installation including multiple IMBs (Image Media Blocks), and each SRTC is implemented by one of the IMBs. In other embodiments, the system is a multiplex theater installation of another type.

In a second class of embodiments, the invention is a method for adjusting and synchronizing at least two secure clocks in a system having a first operating mode and a second operating mode. In the first operating mode, each of the secure clocks is synchronized from time to time (e.g., periodically) to a secure external clock or a clock derived from a secure external clock. In some embodiments, a synchronization operation in the first operating mode includes a step of locking one or more of the secure clocks to a Network Time Protocol (NTP) server via the Internet using secure network transactions. In the second operating mode, each of the secure clocks is adjusted and synchronized without using any external clock. The system typically operates in the second operating mode when a secure external clock is unavailable for synchronizing the secure clocks or when the connection to such a secure external clock is unreliable. For example, the system may be configured to operate in the first operating mode until a scheduled external clock synchronization fails (e.g., because access to the secure external clock is or becomes unavailable) and upon such failure the system automatically defaults to the second operating mode.

In the second class of embodiments, each of the secure clocks is adjustable subject to a set of one or more predetermined adjustment constraints. Typically, each set of adjustment constraints is a maximum adjusted time and a minimum adjusted time, and each secure clock can be adjusted to any time in the range ("allowed adjustment range") between the maximum adjusted time and minimum adjusted time. The intersection of the adjustment constraints of all the secure clocks (the "limit intersection") is predetermined, known to the system, and nonempty (includes at least one time value). The limit intersection is the set or range of all clock times to which all the secure clocks can be synchronized without violating an adjustment constraint of any of the secure clocks. When each of the secure clocks has an allowed adjustment range, the limit intersection is the intersection of all the allowed adjustment ranges.

In the second class of embodiments, the system in the second operating mode synchronizes one (or each of some or all) of the secure clocks to the average adjusted time of the secure clocks (if the average adjusted time is within the limit intersection) or to a substitute average adjusted time within the limit intersection if the average adjusted time is outside the limit intersection (e.g., if the average adjusted time is outside the allowed adjustment range of at least one of the secure clocks). The substitute average adjusted time is a time within the limit intersection that approximates (e.g., most nearly matches) the average adjusted time. In preferred embodiments, the substitute average adjusted time is a boundary of the limit intersection nearest to the average adjusted time (i.e., the upper or lower boundary of the limit intersection, whichever is nearest to the average adjusted time). In a typical implementation in which each secure clock's set of adjustment constraints is a maximum adjusted time and a minimum adjusted time (and the secure clock can be adjusted to any time in the allowed adjustment range between the maximum adjusted time and minimum adjusted time), each of the secure clocks is (or all or some of the secure clocks are) synchronized as follows in the second operating mode:

a smallest of the maximum adjusted times of all the secure clocks is determined (e.g., calculated by clock monitor software), a largest of the minimum adjusted times of the secure clocks is determined, and an average adjusted time of the secure clocks is determined (e.g., by the clock monitor software). The average adjusted time is the average of the current times of the secure clocks, adjusted by any proposed (non-zero) clock adjustment value. The smallest of the maximum adjusted times is the upper bound of the adjustment limit intersection and the largest of the minimum adjusted times is the lower bound of the adjustment limit intersection. If the secure clocks are operating properly, were initially set to GMT (or other universal time), and their drift specifications are being met, then the actual time (GMT or other universal time) is contained within the adjustment limit intersection; and each relevant one of the secure clocks is synchronized to the average adjusted time if the average adjusted time is within the adjustment limit intersection, and each relevant one of the secure clocks is synchronized to a nearest bound of the adjustment limit intersection if the average adjusted time is not within the adjustment limit intersection. The nearest bound of the adjustment limit intersection is the smallest of the maximum adjusted times if the average adjusted time is greater than said smallest of the maximum adjusted times, and is the largest of the minimum adjusted times if the average adjusted time is less than said largest of the minimum adjusted times.

In preferred embodiments, error conditions (e.g., an error condition occurring when the limit intersection is empty) are handled differently, depending upon the condition. In one exemplary embodiment, when a set of secure clocks is to be synchronized in the presence of an "empty limit intersection" error condition, occurring when an allowed adjustment range for one of the secure clocks (the "exceptional" clock) does not intersect the allowed adjustment range for any of the other secure clocks (e.g., because the exceptional clock has drifted beyond its drift specification), the user is notified of this condition and synchronization of the clocks is suspended until the user removes the exceptional clock from the system. Alternatively, the non-exceptional clocks (the secure clocks other than the exceptional clock) are synchronized to a synchronization time in accordance with one of the above-mentioned embodiments of the invention. In one such alternative embodiment, the synchronization time may be the average adjusted time of the non-exceptional secure clocks (if the average adjusted time is within the limit intersection) or a substitute average adjusted time within the limit intersection if the average adjusted time is outside the limit intersection. In some embodiments, the exceptional clock's time is adjusted to match the synchronization time more nearly (preferably to match the synchronization time as nearly as possible) without violating any of the exceptional clock's predetermined adjustment constraints (e.g., while remaining within an allowed adjustment range of the exceptional clock).

In some embodiments, the inventive method includes a step of monitoring the secure clocks to be synchronized (e.g., using clock monitoring software that runs on the system including the secure clocks) to detect whether any of the secure clocks is an inaccurate clock in the sense that it has drifted beyond its drift specification (e.g., by more than the predicted maximum drift amount specified by its manufacturer). Preferably, the system reports each identified inaccurate clock to the system user (e.g., so that it can be replaced).

Other aspects of the invention are a system configured (e.g., programmed) to perform any embodiment of the inventive synchronization method and a computer readable medium which stores code for implementing any embodiment of the inventive method. In some embodiments, the inventive system includes a processor (or processing subsystem) programmed with software (or firmware) and otherwise configured to perform an embodiment of the inventive method.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system, method, and medium will be described with reference to FIGS. 1-4.

Figure 1:
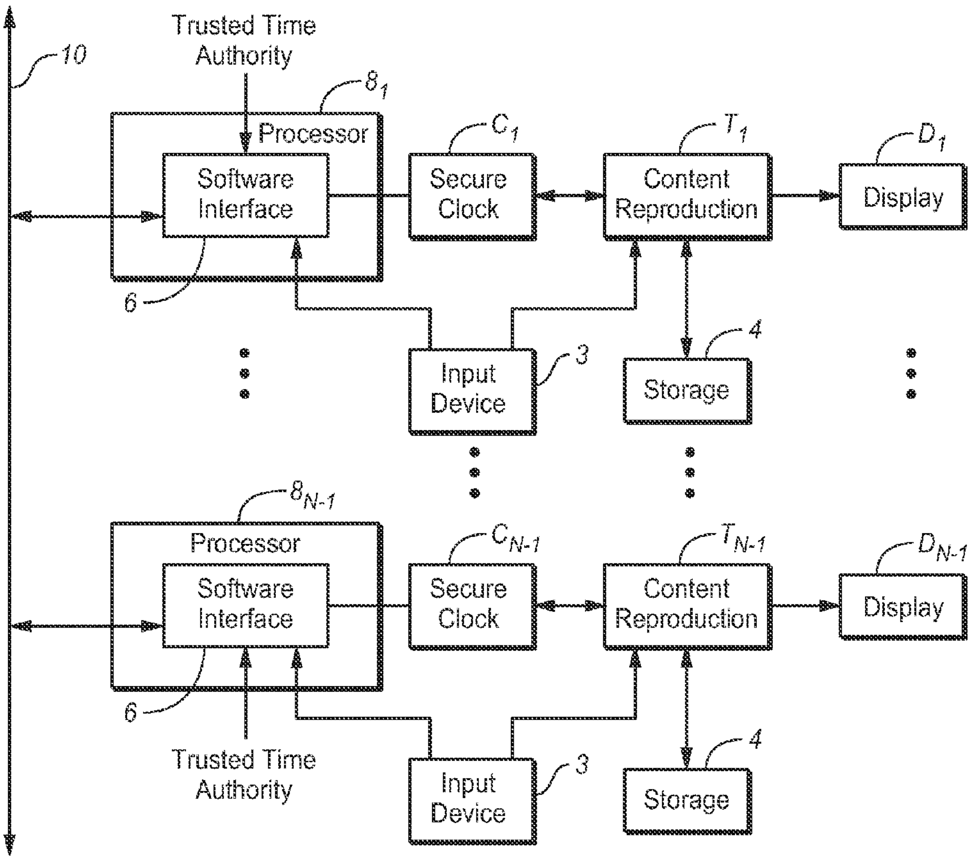
FIG. 1 is a block diagram of a system which includes multiple secure clocks, and is configured to perform an embodiment of the inventive method.

FIG. 1 is a block diagram of a system configured to perform an embodiment of the inventive method. The system includes at least two processors $\mathbf{8}_i$, where "i" is an integer in the range $0 \leqq i \leqq N-1$, an input device 3 (e.g., a mouse and/or a keyboard) coupled to each processor $\mathbf{8}_i$, and a set of N free-running real-time secure clocks, $C_1, \ldots, C_{N-1}$. Each secure clock $C_i$, where "i" is an integer in the range $0 \leqq i \leqq N-1$, is coupled to a trust-based content reproduction system $T_i$ which may be or implement a DRM system, and to one of processors $\mathbf{8}_i$. Each system $T_i$ is coupled to a display device $D_i$ (e.g., a monitor or projector) and to a storage unit 4. In variations on the system shown in FIG. 1, a single trust-based system communicates with all the secure clocks $C_i$, or each secure clock $C_i$ is contained in or associated with a trust-based device or other trust-based system. Each trust-based system $T_i$ (or each system $T_i$ together with the display device $D_i$ coupled thereto) may be a video projector or other digital content reproduction device, and is coupled and configured to reproduce content stored in the storage unit 4 coupled thereto (or content received from a source external to the FIG. 1 system) typically subject to DRM constraints. Each system $T_i$ is coupled and configured to display content (e.g., video content and/or a current time of clock $C_i$) on the display device $D_i$ coupled thereto. Optionally, each display device includes or is replaced by a loudspeaker or other device for playback of audio content provided from one of systems $T_i$ coupled thereto.

Each processor $\mathbf{8}_i$ is programmed with software that implements interface 6. Each secure clock $C_i$ communicates with, and is adjustable in response to, the software interface 6 of the processor $\mathbf{8}_i$ coupled thereto. Processors $\mathbf{8}_i$ are coupled and configured to communicate with each other (e.g., they are linked together in a network 10) so that each processor $\mathbf{8}_i$ is kept informed (e.g., periodically, or in response to a query) of the current time of each clock $C_i$, each adjustment constraint to which each clock $C_i$ is subject, and typically also the initial locked time of each clock $C_i$. Each of processors $\mathbf{8}_i$ is programmed to synchronize the clock $C_i$ coupled thereto with the other clocks in accordance with the invention. The software interface 6 of each processor $\mathbf{8}_i$ includes clock monitor software, and can receive and respond to at least one of: an initial time setting from a user (via input device 3) or trusted time authority; and at least one clock time adjustment request (e.g., a request to adjust the clock $C_i$ coupled to the processor $\mathbf{8}_i$ by an adjustment value, or to synchronize the clock $C_i$ coupled to the processor $\mathbf{8}_i$ without otherwise adjusting it) from the user via input device 3. Alternatively, interface 6 synchronizes the secure clock coupled thereto from time to time (e.g., interface 6 wakes up at random times or periodically, and synchronizes the secure clock $C_i$ coupled thereto with other secure clocks each time it wakes up). Each software interface 6 and each clock $C_i$ may be implemented in a special purpose or general-purpose computer that includes appropriate memory. Optionally, each clock $C_i$ is implemented in hardware.

The current time of each secure clock $C_i$ may be displayed on the display device $D_i$ coupled to the system $T_i$ coupled in turn to the clock $C_i$. Optionally, a time offset (e.g., relative to the current time) is displayed for each secure clock.

Initially, each secure clock $C_i$ is set to a trusted initial time (e.g., by a trusted time authority external to the FIG. 1 system). Although each initial time may associated with any time zone or may have any value, it may be desirable to set it to a standard time or time zone employed by the trust-based system $T_i$ associated with the secure clock. For example, each system $T_i$ may reproduce digital cinema content that is standardized and subject to a digital rights license having time restrictions expressed in accordance with a particular time zone, e.g., Coordinated Universal Time (UTC).

Whether initially set by a user or a trusted time authority, each clock $C_i$ once set is "locked" and restrictions are imposed on subsequent adjustments thereto (each secure clock $C_i$ is adjustable by interface 6 only subject to a set of one or more predetermined adjustment constraints). The initial "locked" time for each clock $C_i$, which may be referred to as $T_{LOCKED}$, is logged by the clock. At the time each synchronization operation commences, the current time of each clock $C_i$, each adjustment constraint to which each clock $C_i$ is subject, and typically also the initial locked time of each clock $C_i$, are known by interface 6.

The FIG. 1 system is operable to adjust and synchronize secure clocks $C_i$ without using any clock external to the FIG. 1 system. Typically, the set of adjustment constraints for each of the secure clocks $C_i$ is a maximum adjusted time and a minimum adjusted time, and each secure clock can be adjusted to any time in the range ("allowed adjustment range") between the maximum adjusted time and minimum adjusted time. Typically, the maximum adjusted time is the initial time plus an allowable clock drift, and the minimum adjusted time is the initial time minus the allowable clock drift.

Typically, the allowable clock drift for each secure clock $C_i$ is (or is a multiple or other function of) a predicted range of drift for the clock. The intersection of the adjustment constraints of all the secure clocks (the "limit intersection") is predetermined, known to the system, and nonempty (includes at least one time value), and is the set or range of all clock times to which all secure clocks $C_i$ can be synchronized without violating an adjustment constraint of any of the secure clocks. When each of secure clocks $C_i$ has an allowed adjustment range, the limit intersection is the intersection of all the allowed adjustment ranges.

The FIG. 1 system is operable to synchronize all the secure clocks $C_i$ to an average adjusted time of the secure clocks (if the average adjusted time is within the limit intersection) or to a substitute average adjusted time within the limit intersection if the average adjusted time is outside the limit intersection (e.g., if the average adjusted time is outside the allowed adjustment range of at least one of the secure clocks). This can occur in response to a request to adjust one of the secure clocks $C_i$ by a proposed clock adjustment value (e.g., to reduce the time value of each of them by "X" seconds, in which case the average adjusted value is the average of the current times of the clocks reduced by "X" seconds) or to synchronize one of the secure clocks $C_i$ without otherwise adjusting it (in which case the average adjusted value is the average of the current times of the clocks). The substitute average adjusted time is a time within the limit intersection that approximates (e.g., most nearly matches) the average adjusted time. In preferred embodiments, the substitute average adjusted time is a boundary of the limit intersection nearest to the average adjusted time (i.e., the upper or lower boundary of the limit intersection, whichever is nearest to the average adjusted time).

In a typical implementation in which each secure clock's set of adjustment constraints is a maximum adjusted time and a minimum adjusted time (and the secure clock can be adjusted to any time in the allowed adjustment range between the maximum adjusted time and minimum adjusted time), one of the secure clocks $C_i$ is synchronized as follows (in response to a request to adjust it by a proposed clock adjustment value, or in order to synchronize it to the other secure clocks without otherwise adjusting it):

(a) a smallest of the maximum times of all the secure clocks $C_i$ is determined (calculated by clock monitor software 6), a largest of the minimum times of the secure clocks is determined (by software 6), and an average adjusted time of the secure clocks is determined (by software 6). The average adjusted time is the average of the current times of the secure clocks, adjusted by any proposed (nonzero) clock adjustment value (e.g., any clock adjustment value requested by a user via input device 3). The smallest of the maximum adjusted times is the upper bound of the adjustment limit intersection and the largest of the minimum adjusted times is the lower bound of the adjustment limit intersection. If the secure clocks are operating properly, were initially set to GMT (or other universal time), and their drift specifications are being met, then the actual current time (GMT or other universal time) of each is contained within the adjustment limit intersection; and (b) software 6 synchronizes said one of the secure clocks $C_i$ to the average adjusted time (if the average adjusted time is within the adjustment limit intersection) or to a nearest bound of the adjustment limit intersection (if the average adjusted time is not within the adjustment limit intersection). The nearest bound of the adjustment limit intersection is the smallest of the maximum adjusted times if the average adjusted time is greater than said smallest of the maximum adjusted times, and is the largest of the minimum adjusted times if the average adjusted time is less than said largest of the minimum adjusted times.

Preferably, in order to determine the average adjusted time, each secure clock $C_i$ logs in memory all adjustments made to its time since it was locked, and one or both of clock $C_i$ and software 6 keeps a running sum of such adjustments. In some implementations, each clock $C_i$ keeps its clock drift limits in memory or is configured to calculate its clock drift limits at specific times when required.

As noted above, each secure clock $C_i$ has a set of adjustment constraints (e.g., a maximum adjusted time and a minimum adjusted time). In a typical implementation, whenever an attempt is made to adjust one of secure clocks $C_i$ by a proposed adjustment time value or to synchronize one of the clocks to the others without otherwise adjusting it, each secure clock (or software 6) calculates (or refers to a running tally of) the time elapsed since the clock was locked, as adjusted by any previous adjustment(s) to the clock's time, to determine the current time of each clock. Software 6 also determines the adjusted average of the current times of the clocks, which is the average of their current times adjusted by any proposed (nonzero) adjustment value, and determines whether the adjusted average is within the limit intersection for the clocks. Software 6 then synchronizes said one of the secure clocks $C_i$ to the adjusted average (if the average is within the limit intersection) or to a nearest bound of the limit intersection (if the adjusted average is not within the limit intersection).

In some embodiments, each secure clock $C_i$ is a Secure Real Time Clock (SRTC), the FIG. 1 system is a D-Cinema multiplex installation including multiple IMBs (Image Media Blocks), and each SRTC is implemented by one of the IMBs. In other embodiments, the FIG. 1 system is a multiplex theater installation of another type.

Figure 2:
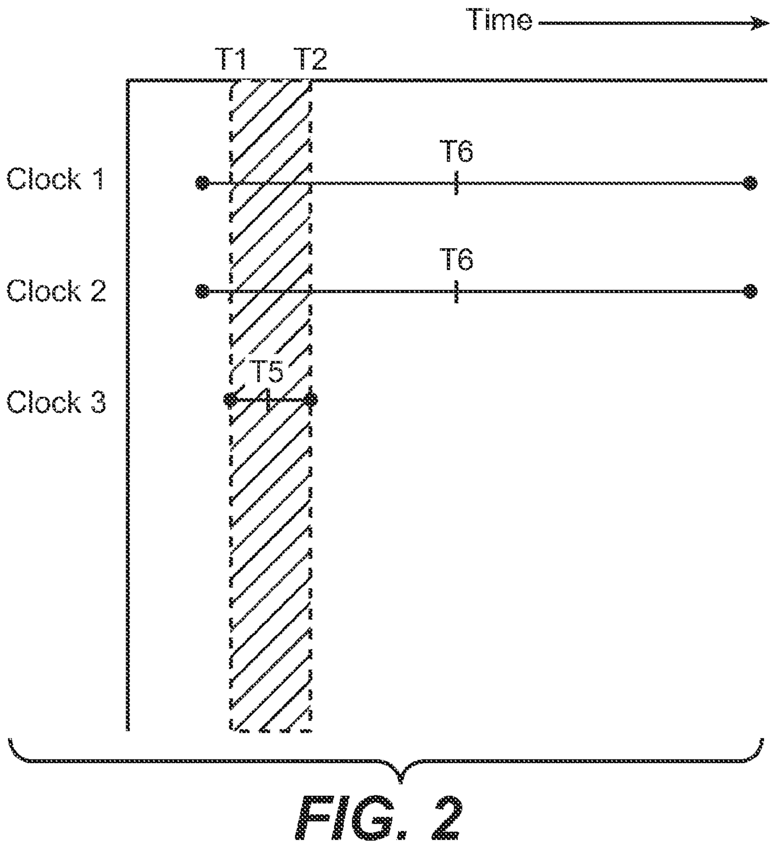
FIG. 2 is a diagram of adjustment limits of three secure clocks to be synchronized in accordance with an embodiment of the inventive method, and their limit intersection.
Figure 3:
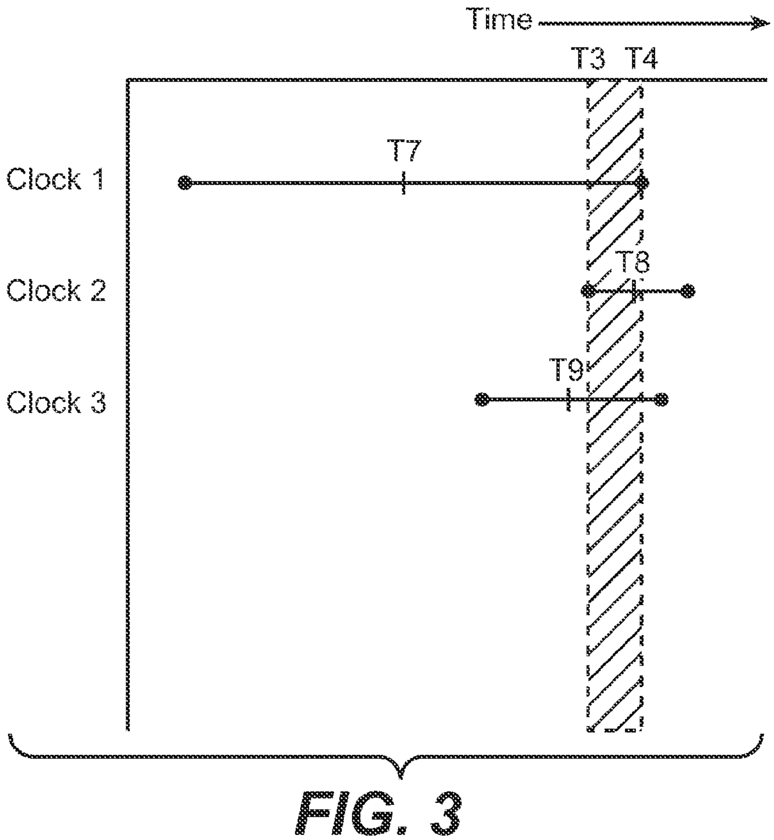
FIG. 3 is a diagram of adjustment limits of three other secure clocks to be synchronized in accordance with an embodiment of the inventive method, and their limit intersection.

With reference to FIGS. 2 and 3, consider next two examples of synchronization of secure clocks $C_i$ of FIG. 1 in accordance with the invention. The examples assume that there are three such secure clocks: $C_1$ (identified as "Clock 1" in FIGS. 2 and 3), $C_2$ (identified as "Clock 2" in FIGS. 2 and 3), and $C_3$ (identified as "Clock 3" in FIGS. 2 and 3). In FIGS. 2 and 3, the left end of each line segment represents the lower adjustment limit (the minimum adjusted time) for the indicated clock, and the right end of the line segment represents the upper adjustment limit (the maximum adjusted time) for the indicated clock.

In the FIG. 2 example, Clock 1 and Clock 2 are older (have been running longer) than Clock 3 and have wider allowed adjustment ranges than Clock 3. The limit intersection for the clocks is the time range from T1 to T2. The limit intersection happens to match the adjustment limits of Clock 3. If a request is made to adjust the clocks such that the proposed adjusted time of Clock 1 is T6, the proposed adjusted time of Clock 2 is T6, and the proposed adjusted time of Clock 3 is T5, then the average of the proposed adjusted clock times (the average of the actual elapsed times of each, as adjusted by a proposed adjustment value) is outside the limit intersection. Specifically, the average is a time value greater than time T2. In response to the request, the time of each of the three clocks would be adjusted to T2 (the maximum adjusted time of Clock 3) in accordance with the invention. Similarly, if the clocks are to be synchronized in accordance with the invention without undergoing any other adjustment, and the current time of Clock 1 is T6, the current time of Clock 2 is T6, and the current time of Clock 3 is T5, then the average of the current times is outside the limit intersection (it is an average time value greater than time T2). To synchronize the three clocks (without otherwise adjusting them), the time of each of them would be adjusted to T2.

In the FIG. 3 example, Clock 1 has a wider allowed adjustment range than either Clock 2 or Clock 3. The limit intersection for the clocks is the time range from T3 to T4 (i.e., the range between the minimum adjusted time of Clock 2 and the maximum adjusted time of Clock 1). If a request is made to adjust the clocks such that the proposed adjusted time of Clock 1 is T7, the proposed adjusted time of Clock 2 is T8, and the proposed adjusted time of Clock 3 is T9, then the average of the proposed adjusted clock times (the average of the actual elapsed times of each, as adjusted by a proposed adjustment value) is outside the limit intersection. Specifically, the average is a time value less than time T3. In response to the request, the time of each of the three clocks would be adjusted to T3 (the minimum adjusted time of Clock 2) in accordance with the invention.

In a second class of embodiments, the invention is a method for adjusting and synchronizing at least two secure clocks in a system having a first operating mode and a second operating mode. In the first operating mode, each of the secure clocks is synchronized from time to time (e.g., periodically) to a secure external clock or a clock derived from a secure external clock. For example, the FIG. 1 system can be implemented to operate in such a first operating mode in which software 6 of each processor $\mathbf{8}_i$ synchronizes the clock $C_i$ coupled to processor $\mathbf{8}_i$ by an operation including a step of locking the secure clock $C_i$ to a Network Time Protocol (NTP) server via the Internet using secure network transactions (and optionally synchronizing other ones of the secure clocks to one such newly locked clock). The locking to an external clock can be done in a conventional manner subject to the adjustment constraints of each clock, for example, the manner described in above-cited U.S. Pat. No. 7,266,714.

In the second operating mode, the secure clock is adjusted and synchronized without using any external clock. For example, each processor $\mathbf{8}_i$ of the FIG. 1 system can be implemented to operate in the second operating mode when a secure external clock is unavailable for synchronizing the secure clock $C_i$ coupled thereto or when the connection to such a secure external clock is unreliable. For example, the FIG. 1 system may be configured to operate in the first operating mode until a scheduled external clock synchronization fails (e.g., because access to a secure external clock is or becomes unavailable) and upon such failure the system automatically defaults to the second operating mode.

In the second class of embodiments, each of the secure clocks is adjustable subject to a set of one or more predetermined adjustment constraints. Typically, each set of adjustment constraints is a maximum adjusted time and a minimum adjusted time, and each secure clock can be adjusted to any time in the range ("allowed adjustment range") between the maximum adjusted time and minimum adjusted time. The intersection of the adjustment constraints of all the secure clocks (the "limit intersection") is predetermined, known to the system, and nonempty (includes at least one time value). The limit intersection is the set or range of all clock times to which all the secure clocks can be synchronized without violating an adjustment constraint of any of the secure clocks.

In the second class of embodiments, the system in the second operating mode synchronizes one (or each of some or all) of the secure clocks to the average adjusted time of the secure clocks (if the average adjusted time is within the limit intersection) or to a substitute average adjusted time within the limit intersection if the average adjusted time is outside the limit intersection (e.g., if the average adjusted time is outside the allowed adjustment range of at least one of the secure clocks). The substitute average adjusted time is a time within the limit intersection that approximates (e.g., most nearly matches) the average adjusted time. In preferred embodiments, the substitute average adjusted time is a boundary of the limit intersection nearest to the average adjusted time (i.e., the upper or lower boundary of the limit intersection, whichever is nearest to the average adjusted time). In a typical implementation in which each secure clock's set of adjustment constraints is a maximum adjusted time and a minimum adjusted time (and the secure clock can be adjusted to any time in the allowed adjustment range between the maximum adjusted time and minimum adjusted time), one (or each of some or all) of the secure clocks is synchronized in the second operating mode (in response to a request to adjust it by a proposed clock adjustment value, or in order to synchronize it without otherwise adjusting it) in accordance with the two-step method described above (including above-described steps (a) and (b)) by which the FIG. 1 system synchronizes secure clocks $C_i$.

In preferred embodiments, the inventive system and method handles error conditions (e.g., an error condition occurring when the limit intersection is empty) differently, depending upon the condition. Consider an exemplary embodiment in which secure clocks Ci of FIG. 1 are to be synchronized in the presence of an "empty limit intersection" error condition occurring when an allowed adjustment range for one of the secure clocks (the "exceptional" clock) does not intersect the allowed adjustment range for any of the other secure clocks (e.g., because the exceptional clock has drifted beyond its drift specification). In the exemplary embodiment, the user is notified of the presence of an exceptional clock, and synchronization of the clocks is suspended until the user removes the exceptional clock from the system. Alternatively, the non-exceptional ones of clocks $C_i$ (the secure clocks other than the exceptional clock) are synchronized to a synchronization time in accordance with one of the above-described embodiments of the invention. In one such alternative embodiment, the synchronization time is the average adjusted time of the non-exceptional secure clocks (if the average adjusted time is within the limit intersection) or a substitute average adjusted time within the limit intersection if the average adjusted time is outside the limit intersection, and the exceptional clock's time is adjusted to match the synchronization time more nearly (preferably to match the synchronization time as nearly as possible) without violating any of the exceptional clock's predetermined adjustment constraints (e.g., while remaining within an allowed adjustment range of the exceptional clock).

Thus, in a class of embodiments, the invention is a method for synchronizing at least three secure clocks in a system without using any external clock, where each of the secure clocks is adjustable subject to a set of one or more predetermined adjustment constraints, the intersection of the adjustment constraints of all the secure clocks is an empty limit intersection, at least one of the secure clocks is an exceptional clock and the other ones of the secure clocks are non-exceptional clocks, and the intersection of the adjustment constraints of all the non-exceptional clocks is a non-empty limit intersection, said method including the steps of:

(a) determining an average adjusted time of the non-exceptional clocks and determining whether the average adjusted time is within the limit intersection;

(b) synchronizing at least one of the non-exceptional clocks to a synchronization time, wherein the synchronization time is an average adjusted time of said non-exceptional clocks if the average adjusted time is within the limit intersection, and the synchronization time is a substitute average adjusted time within the limit intersection if the average adjusted time is outside the limit intersection; and (c) adjusting the exceptional clock's time to more nearly match the synchronization time without violating any of the exceptional clock's predetermined adjustment constraints.

In some embodiments, the inventive method includes a step of monitoring the secure clocks to be synchronized to detect whether any of the secure clocks is an inaccurate clock in the sense that it has drifted beyond its drift specification (e.g., by more than the predicted maximum drift amount specified by its manufacturer). For example, the FIG. 1 system may be implemented such that clock monitoring software 6 of processor $\mathbf{8}_i$ detects whether the secure clock $C_i$ coupled to processor $\mathbf{8}_i$ is an inaccurate clock in the sense that it has drifted beyond its drift specification, and preferably reports (or causes the system to report) each identified inaccurate clock to the system user (e.g., by causing an appropriate indication to be displayed on one of display devices $D_i$). In response to the indication, the user can take steps to replace the inaccurate clock with a clock that operates within the relevant specification.

Aspects of the invention are a system configured to perform any embodiment of the inventive synchronization method. In typical embodiments, the inventive system includes a processor or processing subsystem (e.g., at least one of processors 8$_i$ of FIG. 1 which runs software 6) programmed with software or firmware and otherwise configured to perform an embodiment of the inventive method.

Figure 4:
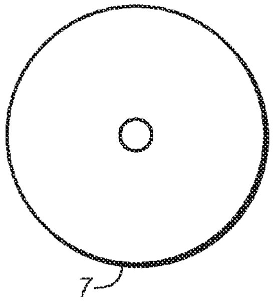
FIG. 4 is a computer readable medium which stores code for implementing an embodiment of the inventive method.

Another aspect of the invention is a computer readable medium which stores code for implementing any embodiment of the inventive method. For example, computer readable optical disk 7 of FIG. 4 is a computer readable medium which has computer readable code stored thereon. The code is suitable for programming the system of FIG. 1 to implement an embodiment of the inventive method.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for synchronizing at least two secure clocks in a system without using any external clock, where each of the secure clocks is adjustable subject to a set of one or more predetermined adjustment constraints, and the intersection of the adjustment constraints of all the secure clocks is a limit intersection, said method including the steps of:

(a) determining an average adjusted time of the secure clocks and determining whether the average adjusted time is within the limit intersection; and (b) synchronizing at least one of the secure clocks to the average adjusted time if said average adjusted time is within the limit intersection, and synchronizing said at least one of the secure clocks to a substitute average adjusted time within the limit intersection if the average adjusted time is outside the limit intersection.

2. The method of claim 1, wherein steps (a) and (b) are performed in response to a request to adjust said at least one of the secure clocks by a clock adjustment value, and the average adjusted time is an average of current times of the secure clocks adjusted by the clock adjustment value.

3. The method of claim 1, wherein steps (a) and (b) are performed in response to a request to synchronize said at least one of the secure clocks without otherwise adjusting said at least one of the secure clocks, and the average adjusted time is an average of current times of the secure clocks.

4. The method of claim 1, wherein each said set of adjustment constraints is a maximum adjusted time and a minimum adjusted time for one of the secure clocks, each of the secure clocks is adjustable to any time in an allowed adjustment range between one said maximum adjusted time and one said minimum adjusted time, and the limit intersection is the intersection of all the allowed adjustment ranges.

5. The method of claim 1, wherein the substitute average adjusted time is a boundary of the limit intersection nearest to the average adjusted time.

6. The method of claim 5, wherein the set of adjustment constraints of each of the secure clocks is a maximum adjusted time and a minimum adjusted time for said each of the secure clocks, step (a) includes the step of determining a smallest of the maximum adjusted times of the secure clocks and a largest of the minimum adjusted times of the secure clocks, the substitute average adjusted time is the smallest of the maximum adjusted times if the average adjusted time is greater than said smallest of the maximum adjusted times, and the substitute average adjusted time is the largest of the minimum adjusted times if the average adjusted time is less than said largest of the minimum adjusted times.

7. The method of claim 1, wherein the system is a cinema multiplex installation including at least two image media blocks, and each of the secure clocks is a secure real time clock implemented by one of the image media blocks.

8. The method of claim 1, also including a step of monitoring at least one of the secure clocks to detect whether said one of the secure clocks is an inaccurate clock, and asserting an indication of presence of an inaccurate clock in response to detecting that said one of the secure clocks is an inaccurate clock.

9. A method for adjusting and synchronizing at least two secure clocks in a system operable in a first operating mode to synchronize the secure clocks to at least one of a secure external clock and a clock derived from a secure external clock, wherein the system is also operable in a second operating mode to synchronize the clocks without using any external clock, wherein each of the secure clocks is adjustable subject to a set of one or more predetermined adjustment constraints, and the intersection of the adjustment constraints of all the secure clocks is a limit intersection, said method including a step of operating the system in the second operating mode to synchronize the secure clocks by:

(a) determining an average adjusted time of the secure clocks and determining whether the average adjusted time is within the limit intersection; and (b) synchronizing at least one of the secure clocks to the average adjusted time if said average adjusted time is within the limit intersection, and synchronizing said at least one of the secure clocks to a substitute average adjusted time within the limit intersection if the average adjusted time is outside the limit intersection.

10. The method of claim 9, also including a step of operating the system in the first operating mode to lock said at least one of the secure clocks to a Network Time Protocol server via the Internet using secure network transactions.

11. The method of claim 9, including the step of operating the system in the first operating mode when a secure external clock is available for synchronizing said at least one of the secure clocks, and operating the system in the second operating mode when no secure external clock is available for synchronizing said at least one of the secure clocks.

12. The method of claim 9, including the step of operating the system in the second operating mode in response to failure of a scheduled external clock synchronization operation.

13. The method of claim 9, wherein steps (a) and (b) are performed in response to a request to adjust said at least one of the secure clocks by a clock adjustment value, and the average adjusted time is an average of current times of the secure clocks adjusted by the clock adjustment value.

14. The method of claim 9, wherein steps (a) and (b) are performed in response to a request to synchronize said at least one of the secure clocks without otherwise adjusting said at least one of the secure clocks, and the average adjusted time is an average of current times of the secure clocks.

15. The method of claim 9, wherein each said set of adjustment constraints of each of the secure clocks is a maximum adjusted time and a minimum adjusted time for said each of the secure clocks, each of the secure clocks is adjustable to any time in an allowed adjustment range between one said maximum adjusted time and one said minimum adjusted time, and the limit intersection is the intersection of all the allowed adjustment ranges.

16. The method of claim 9, wherein the substitute average adjusted time is a boundary of the limit intersection nearest to the average adjusted time.

17. The method of claim 16, wherein the set of adjustment constraints of each of the secure clocks is a maximum adjusted time and a minimum adjusted time for said each of the secure clocks, step (a) includes the step of determining a smallest of the maximum adjusted times of the secure clocks and a largest of the minimum adjusted times of the secure clocks, the substitute average adjusted time is the smallest of the maximum adjusted times if the average adjusted time is greater than said smallest of the maximum adjusted times, and the substitute average adjusted time is the largest of the minimum adjusted times if the average adjusted time is less than said largest of the minimum adjusted times.

18. The method of claim 9, wherein the system is a cinema multiplex installation including at least two image media blocks, and each of the secure clocks is a secure real time clock implemented by one of the image media blocks.

19. The method of claim 9, also including a step of monitoring at least one of the secure clocks to detect whether said one of the secure clocks is an inaccurate clock, and asserting an indication of presence of an inaccurate clock in response to detecting that said one of the secure clocks is an inaccurate clock.

20. A method for synchronizing at least three secure clocks in a system without using any external clock, where each of the secure clocks is adjustable subject to a set of one or more predetermined adjustment constraints, the intersection of the adjustment constraints of all the secure clocks is an empty limit intersection, at least one of the secure clocks is an exceptional clock and the other ones of the secure clocks are non-exceptional clocks, and the intersection of the adjustment constraints of all the non-exceptional clocks is a non-empty limit intersection, said method including the steps of:

(a) determining an average adjusted time of the non-exceptional clocks and determining whether the average adjusted time is within the limit intersection;

(b) synchronizing at least one of the non-exceptional clocks to a synchronization time, wherein the synchronization time is the average adjusted time of said non-exceptional clocks if said average adjusted time is within the limit intersection, and the synchronization time is a substitute average adjusted time within the limit intersection if the average adjusted time is outside the limit intersection; and (c) adjusting the exceptional clock's time to more nearly match the synchronization time without violating any of the exceptional clock's predetermined adjustment constraints.

21. A system configured to synchronize at least two secure clocks without using any external clock, where each of the secure clocks is adjustable subject to a set of one or more predetermined adjustment constraints, and the intersection of the adjustment constraints of all the secure clocks is a limit intersection, said system including:

a first subsystem including the secure clocks; and a second subsystem coupled to the first subsystem, and configured to determine an average adjusted time of the secure clocks, to synchronize at least one of the secure clocks to the average adjusted time if said average adjusted time is within the limit intersection, and to synchronize said at least one of the secure clocks to a substitute average adjusted time within the limit intersection if the average adjusted time is outside the limit intersection.

22. The system of claim 21, wherein the second subsystem is a processor programmed with software to determine the average adjusted time, to determine whether the average adjusted time is within the limit intersection, to synchronize said at least one of the secure clocks to the average adjusted time if said average adjusted time is within the limit intersection, and to synchronize said at least one of the secure clocks to the substitute average adjusted time if the average adjusted time is outside the limit intersection.

23. The system of claim 21, wherein the second subsystem is configured to synchronize said at least one of the secure clocks to the average adjusted time if said average adjusted time is within the limit intersection and to the substitute average adjusted time if said average adjusted time is outside the limit intersection, in response to a request to adjust said at least one of the secure clocks by a clock adjustment value, wherein the average adjusted time is an average of current times of the secure clocks adjusted by the clock adjustment value.

24. The system of claim 21, wherein the second subsystem is configured to synchronize said at least one of the secure clocks to the average adjusted time if said average adjusted time is within the limit intersection and to the substitute average adjusted time if said average adjusted time is outside the limit intersection, in response to a request to synchronize said at least one of the secure clocks without otherwise adjusting said at least one of the secure clocks, wherein the average adjusted time is an average of current times of the secure clocks.

25. The system of claim 21, wherein each said set of adjustment constraints of each of the secure clocks is a maximum adjusted time and a minimum adjusted time for said each of the secure clocks, each of the secure clocks is adjustable to any time in an allowed adjustment range between one said maximum adjusted time and one said minimum adjusted time, and the limit intersection is the intersection of all the allowed adjustment ranges.

26. The system of claim 21, wherein the substitute average adjusted time is a boundary of the limit intersection nearest to the average adjusted time.

27. The system of claim 26, wherein the set of adjustment constraints of each of the secure clocks is a maximum adjusted time and a minimum adjusted time for said each of the secure clocks, the second subsystem is configured to determine a smallest of the maximum adjusted times of the secure clocks and a largest of the minimum adjusted times of the secure clocks, the substitute average adjusted time is the smallest of the maximum adjusted times if the average adjusted time is greater than said smallest of the maximum adjusted times, and the substitute average adjusted time is the largest of the minimum adjusted times if the average adjusted time is less than said largest of the minimum adjusted times.

28. The system of claim 21, wherein the system is a cinema multiplex installation including at least two image media blocks, and each of the secure clocks is a secure real time clock implemented by one of the image media blocks.

29. A system operable in a first operating mode to synchronize at least two secure clocks to at least one of a secure external clock and a clock derived from a secure external clock, wherein the system is also operable in a second operating mode to synchronize the secure clocks without using any external clock, where each of the secure clocks is adjustable subject to a set of one or more predetermined adjustment constraints and the intersection of the adjustment constraints of all the secure clocks is a limit intersection, said system including:

a first subsystem including the secure clocks; and a second subsystem coupled to the first subsystem and operable in the second operating mode to synchronize the secure clocks by determining an average adjusted time of the secure clocks, synchronizing at least one of the secure clocks to the average adjusted time if said average adjusted time is within the limit intersection, and synchronizing said at least one of the secure clocks to a substitute average adjusted time within the limit intersection if the average adjusted time is outside the limit intersection.

30. The system of claim 29, wherein the second subsystem is a processor programmed with software to be operable in the second operating mode to determine the average adjusted time, to synchronize said at least one of the secure clocks to the average adjusted time if said average adjusted time is within the limit intersection, and to synchronize said at least one of the secure clocks to the substitute average adjusted time if the average adjusted time is outside the limit intersection.

31. The system of claim 29, wherein the second subsystem is operable in the second operating mode to determine the average adjusted time, to synchronize said at least one of the secure clocks to the average adjusted time if said average adjusted time is within the limit intersection, and to synchronize said at least one of the secure clocks to the substitute average adjusted time if the average adjusted time is outside the limit intersection in response to a request to adjust said at least one of the secure clocks by a clock adjustment value, and wherein the average adjusted time is an average of current times of the secure clocks adjusted by the clock adjustment value.

32. The system of claim 29, wherein the second subsystem is operable in the second operating mode to determine the average adjusted time, to synchronize said at least one of the secure clocks to the average adjusted time if said average adjusted time is within the limit intersection, and to synchronize said at least one of the secure clocks to the substitute average adjusted time if the average adjusted time is outside the limit intersection in response to a request to synchronize said at least one of the secure clocks without otherwise adjusting said at least one of the secure clocks, and wherein the average adjusted time is an average of current times of the secure clocks.

33. The system of claim 29, wherein each said set of adjustment constraints is a maximum adjusted time and a minimum adjusted time for one of the secure clocks, each of the secure clocks is adjustable to any time in an allowed adjustment range between one said maximum adjusted time and one said minimum adjusted time, and the limit intersection is the intersection of all the allowed adjustment ranges.

34. The system of claim 29, wherein the substitute average adjusted time is a boundary of the limit intersection nearest to the average adjusted time.

35. The system of claim 29, wherein the set of adjustment constraints of each of the secure clocks is a maximum adjusted time and a minimum adjusted time for said each of the secure clocks, the second subsystem is operable in the second operating mode to determine a smallest of the maximum adjusted times of the secure clocks and a largest of the minimum adjusted times of the secure clocks, the substitute average adjusted time is the smallest of the maximum adjusted times if the average adjusted time is greater than said smallest of the maximum adjusted times, and the substitute average adjusted time is the largest of the minimum adjusted times if the average adjusted time is less than said largest of the minimum adjusted times.

36. The system of claim 29, wherein the system is a cinema multiplex installation including at least two image media blocks, and each of the secure clocks is a secure real time clock implemented by one of the image media blocks.

37. A system configured to synchronize at least two secure clocks without using any external clock, where each of the secure clocks is adjustable subject to a set of one or more predetermined adjustment constraints, and the intersection of the adjustment constraints of all the secure clocks is a limit intersection, said system including:

a first subsystem including a first one of the secure clocks;

a first processor, coupled to the first subsystem;

a second subsystem including a second one of the secure clocks; and a second processor, coupled to the first processor and to the second subsystem;

wherein the first processor is coupled and programmed to determine an average adjusted time of the secure clocks, to synchronize the first one of the secure clocks to the average adjusted time if said average adjusted time is within the limit intersection, and to synchronize the first one of the secure clocks to a substitute average adjusted time within the limit intersection if the average adjusted time is outside the limit intersection; and wherein the second processor is coupled and programmed to determine the average adjusted time of the secure clocks, to synchronize the second one of the secure clocks to the average adjusted time if said average adjusted time is within the limit intersection, and to synchronize the second one of the secure clocks to the substitute average adjusted time within the limit intersection if the average adjusted time is outside the limit intersection.

38. The system of claim 37, wherein the substitute average adjusted time is a boundary of the limit intersection nearest to the average adjusted time.

39. The system of claim 37, wherein the set of adjustment constraints of each of the secure clocks is a maximum adjusted time and a minimum adjusted time for said each of the secure clocks, the first processor is coupled and programmed to determine a smallest of the maximum adjusted times of the secure clocks and a largest of the minimum adjusted times of the secure clocks, the substitute average adjusted time is the smallest of the maximum adjusted times if the average adjusted time is greater than said smallest of the maximum adjusted times, and the substitute average adjusted time is the largest of the minimum adjusted times if the average adjusted time is less than said largest of the minimum adjusted times.

40. The system of claim 37, wherein the system is a cinema multiplex installation including at least two image media blocks, and each of the secure clocks is a secure real time clock implemented by one of the image media blocks.

* * * * *